(12) United States Patent
Hofmann et al.

(10) Patent No.: US 8,419,289 B2
(45) Date of Patent: *Apr. 16, 2013

(54) RADIAL ANTI-FRICTION BEARING, IN PARTICULAR, SINGLE-ROW SPHERICAL ROLLER BEARING, AND METHOD FOR MOUNTING THEREOF

(75) Inventors: Heinrich Hofmann, Schweinfurt (DE); Horst Doppling, Herzogenaurach (DE); Rainer Eidloth, Herzogenaurach (DE); Georg Goppelt, Pfofeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1129 days.

This patent is subject to a terminal disclaimer.

(21) Appl. No.: 12/298,439

(22) PCT Filed: Apr. 17, 2007

(86) PCT No.: PCT/DE2007/000664
§ 371 (c)(1), (2), (4) Date: Jan. 14, 2009

(87) PCT Pub. No.: WO2007/121711
PCT Pub. Date: Nov. 1, 2007

(65) Prior Publication Data
US 2009/0185770 A1    Jul. 23, 2009

(30) Foreign Application Priority Data
Apr. 26, 2006 (DE) .......................... 10 2006 019 228

(51) Int. Cl.
*F16C 33/36* (2006.01)
(52) U.S. Cl.
USPC .......................................... 384/568

(58) Field of Classification Search .............. 384/447, 384/513, 568, 516; *F16C 19/36*
See application file for complete search history.

(56) References Cited

U.S. PATENT DOCUMENTS

| 1,301,527 | A | * | 4/1919 | Weibull | 384/560 |
| 4,802,775 | A | * | 2/1989 | Takata | 384/450 |
| 2003/0016893 | A1 | * | 1/2003 | Abe et al. | 384/516 |
| 2005/0117827 | A1 | | 6/2005 | Fujii et al. | |

FOREIGN PATENT DOCUMENTS

| AT | 88755 | 11/1921 |
| DE | 168499 | 2/1903 |
| DE | 151483 | 5/1904 |
| DE | 311317 | 3/1919 |
| DE | 2007477 | 8/1975 |

(Continued)

*Primary Examiner* — Richard W Ridley
*Assistant Examiner* — Thomas Diaz
(74) *Attorney, Agent, or Firm* — Volpe and Koenig, P.C.

(57) ABSTRACT

A radial bearing configured as a single-row spherical roller bearing is provided that includes an inner and outer bearing ring, and rollers arranged between the bearing rings. The rollers have two side faces which are flattened symmetrically from a spherical base shape, and roll in two groove-shaped raceways which are defined by two axial rims. The width of the rollers between their side faces is at least 70% of the diameter of the spherical base shape and is greater than the distance between the axial rims. The rollers are in full linear contact with their running faces in the bearing rings at an operational pressure angle of up to 25° on both sides of the bearing longitudinal axis. The distance between radially opposite axial rims when the bearing rings are arranged eccentrically to each other is less than the diameter of the spherical base shape of the rollers.

5 Claims, 3 Drawing Sheets

FOREIGN PATENT DOCUMENTS

| | | |
|---|---|---|
| DE | 2407477 | 8/1975 |
| DE | 4334195 | 3/1994 |
| DE | 10027105 | 2/2001 |
| DE | 10392207 | 1/2005 |
| DE | 102005014556 | 10/2006 |
| GB | 249806 | 5/1926 |
| GB | 1369501 | 10/1974 |
| JP | 10213147 | 8/1998 |
| JP | 2002168260 | 6/2002 |
| JP | 2004308742 | 11/2004 |
| JP | 2005337335 | 12/2005 |

* cited by examiner

RADIAL ANTI-FRICTION BEARING, IN PARTICULAR, SINGLE-ROW SPHERICAL ROLLER BEARING, AND METHOD FOR MOUNTING THEREOF

FIELD OF THE INVENTION

The invention relates to a radial anti-friction bearing that is suitable for high axial loads and also to a method for mounting such a radial anti-friction bearing. The invention can be realized in an especially advantageous way with single-row spherical roller bearings that can be used, for example, as fixed bearings in motor-vehicle gear boxes.

BACKGROUND

As radial anti-friction bearings that can also be loaded with high axial forces, in practice, primarily single-row deep groove ball bearings are used, because these feature a uniform high radial and axial load capacity, low friction, and the highest rotational speed limits of all bearing types. These deep groove ball bearings are made, in a known way, from an outer bearing ring and an inner bearing ring, and also from a number of bearing balls arranged between the bearing rings as anti-friction bodies. Here, in the inside of the outer bearing ring and in the outside of the inner bearing ring, groove-shaped raceways are incorporated that are each limited by two axial rims and in which the bearing balls are guided at uniform distances relative to each other by a bearing cage. The use of the bearing balls in the deep groove ball bearing is here usually realized by the eccentric assembly method that has become known with DE 168 499 in which the two bearing rings are arranged eccentric to each other and the resulting free space between the bearing rings is filled with the bearing balls. Then the inner bearing ring is brought into the position concentric to the outer bearing ring under use of the elasticity of both bearing rings, so that the bearing balls can then be distributed uniformly in the raceways of the bearing rings and the bearing cage can be used.

In practice, however, it has been proven that such deep groove ball bearings are nevertheless subject to limits primarily with respect to the radial load capacity of the bearing due to the small maximum number of balls that can be installed. This number is dependent on the dimensions of the inner and the outer bearing rings and also the ball diameter. Therefore, in the past a plurality of solutions, such as, for example, an unsealed filling opening according to DE 151 483 arranged in opposite rims of the raceways of the outer and the inner bearing rings or a similarly constructed closable filling opening according to DE 24 07 477 A1, has been proposed with which an increase of the radial load capacity by deep groove ball bearings should be achieved by increasing the number of balls. These proposals, however, cannot be realized in practice due to numerous disadvantages.

In addition, another possibility for increasing the number of anti-friction bodies in a radial anti-friction bearing was known first through DE 311 317 and was improved by DE 43 34 195 A1. For these radial anti-friction bearings formed as single-row deep groove ball bearings, however, the anti-friction bodies are formed not by balls but instead by so-called spherical rollers that are formed with two side surfaces flattened symmetrically from a spherical base shape and also side surfaces arranged parallel to each other. The width of these spherical rollers between their side surfaces is here less than the distance between the radially opposing axial rims of the raceways in the bearing rings, so that filling the bearing with spherical rollers can be performed with the so-called axial mounting method in which the spherical rollers can be inserted in the axial direction into the bearing through the distance between the inner ring and the outer ring. If the center point of the bearing rollers is then located at the height of the raceway axis, the spherical rollers are turned once vertically and once horizontally by 90°, so that they can roll with their running surfaces in the raceways of the bearing rings.

However, despite the possibility of inserting these specially shaped spherical rollers axially into the bearing and thus filling the radial anti-friction bearings almost completely with a high number of anti-friction bodies that can be used for high radial loads, such a spherical roller bearing represents only a compromise with respect to the axial load capacity of the bearing. This is based on the fact that the spherical rollers can have a construction that is only relatively flat due to their ability to be inserted in the axial direction into the bearing only with a small width between their side surfaces and the raceways of the spherical rollers in the bearing rings, in order to be able to allow the rotation of the anti-friction bodies into their operating position, without producing too much radial play in the entire bearing. The relatively flat raceways of the spherical rollers, however, have the effect that, for adapting to an axially acting operational pressure angle acting in the axial direction, the spherical rollers provide too small a support surface due to axial tilting within their raceways, so that primarily the axial load capacity of such a spherical roller bearing is very low and such spherical roller bearings are thus unsuitable for high axial loads.

Therefore, for avoiding these disadvantages, it was proposed by the German Patent Application with the filing number 10 2005 014 556.6, that had not yet been published at the application date of the present patent application, to increase the width of the spherical rollers between their side surfaces to at least 70% of the diameter of their spherical base shape and to form the groove-shaped raceways of the spherical rollers in the bearing rings with a depth between 17% and 19% and also a width between 75% and 78% of the diameter of the spherical base shape of the spherical rollers, because in this way a total contact area of the spherical rollers to their raceways of approximately 45% of the periphery of the spherical base shape of the spherical rollers is produced, increasing both the radial and also the axial load capacity of the bearing, like the balls of conventional deep groove ball bearings have relative to their raceways in the bearing rings. However, because the distance between the rims defining the anti-friction body raceways of the inner and the outer bearing rings is smaller than the width of the spherical rollers, the setting of the spherical rollers into the radial anti-friction bearing must be performed again according to the known eccentric mounting method in which the spherical rollers are placed in a vertical position at the location of the greatest distance of the radially opposing rims of the two bearing rings arranged eccentric to each other perpendicular in the anti-friction body raceways and are shifted with their side surfaces contacting each other in the free space between the bearing rings. The flattened side surfaces of the spherical rollers, however, allow an increased number of anti-friction bodies to be mounted in the bearing compared with single-row deep groove ball bearings even with the eccentric mounting method. After filling the bearing with the bearing rollers, the inner bearing ring is then brought into the position concentric to the outer bearing ring, so that the spherical rollers are distributed on the reference circle of their raceways with a uniform distance to each other and can be pivoted by 90° into their operating position arranged longitudinal to the raceways, in order to then insert the bearing cage into the radial anti-friction bearing.

With such a spherical roller bearing formed in this way, it was indeed achieved that the spherical rollers have large contact surfaces to their raceways in the bearing rings and that the bearing can be equipped with a larger number of anti-friction bodies than conventional single-row deep groove ball bearings, so that, above all, the radial load capacity of the bearing increases relative to conventional deep groove ball bearings and the axial installation space and the weight of the bearing was reduced. Nevertheless, the increase of the axial load capacity of the bearing was relatively small, because the raceways of the spherical rollers that were indeed deepened were still too flat to completely support the spherical rollers for adaptation to the acting operating pressure angle through axial tilting within their raceways, so that such spherical roller bearings are still unsuitable for variable axial loads under extremely high operating pressure angles.

SUMMARY

Starting from the illustrated disadvantages of the solutions of the known state of the art, the invention is based on the objective of providing a radial anti-friction bearing, in particular, a single-row spherical roller bearing that is also suitable, in addition to a high radial load capacity, for variable axial loads under high operating pressure angles on both sides of the bearing longitudinal axis.

According to the invention, this objective is met for a radial anti-friction bearing in that the raceways are formed in both bearing rings with an extremely increased depth and width such that, with their running surfaces, the spherical rollers are in complete linear contact to the raceways in the bearing rings even for variable axial loads under an operating pressure angle of up to 25° on both sides of the bearing longitudinal axis and here the distance between the radially opposing, axial rims of the raceways in the bearing rings is so small that this distance is smaller than a diameter of the spherical base shape of the spherical rollers even for bearing rings arranged eccentric to each other.

Preferred configurations and improvements of the radial anti-friction bearing formed according to the invention are described in the dependent claims.

According to another aspect of the invention, it is provided in the radial anti-friction bearing formed according to the invention that the raceways in the inside of the outer bearing ring and in the outside of the inner bearing ring have a depth greater than 25% of the diameter of the spherical base shape of the spherical rollers, while the width of the raceways in the bearing rings equals greater than 85% of the diameter of the spherical base shape of the spherical rollers. The formation of the raceways with such dimensions clearly goes beyond the raceway dimensions of conventional deep groove ball bearings and guarantees that the spherical rollers feature a one-hundred percent degree of osculation relative to their raceways as a function of the radial bearing clearance even for operating pressure angles up to 25° and the bearing thus produces an extremely high axial load capacity for full radial loading.

According to another aspect of the invention, the radial anti-friction bearing formed according to the invention is also distinguished in that for a concentric arrangement of the bearing rings to each other, the distance between the radially opposing, axial rims of the raceways equals only approximately 40% to 50% of the diameter of the spherical base shape of the spherical rollers, while for an eccentric arrangement of the bearing rings to each other, the greatest distance between these axial rims equals between 75% to 90% of the diameter of the spherical base shape of the spherical rollers. For a width of the spherical rollers between their side surfaces of 70% of their spherical base shape, initially it appears to be impossible to be able to introduce the spherical rollers into the radial anti-friction bearing either according to the known axial mounting method or according to the conventional eccentric mounting method, because for both methods the distance between the rims of the raceways is too small.

Therefore, the method according to the invention for mounting such a radial anti-friction bearing presents a modified eccentric mounting method for spherical rollers in which initially in a known way the inner bearing ring is placed in the outer bearing ring and the bearing rings are arranged in an eccentric position relative to a common radial axis. In contrast to the known eccentric mounting method, however, then the insertion of a first spherical roller is performed not in the vertical position but instead in the tangential position of the side surfaces to the bearing rings at the position of the greatest distance of the radially opposing rims of the bearing rings, in order to then tilt this first spherical roller by 90° in the raceways of the bearing rings into a position perpendicular to these rings and, in this position, to shift it into a first lateral intermediate position between the bearing rings. Then a second spherical roller is pushed into the tangential position of the side surfaces relative to the bearing rings at the position of the greatest distance of the rims between the bearing rings, in order to likewise tilt by 90° in the raceways of the bearing rings into a position perpendicular to these rings and, in this position, to be shifted into a second lateral intermediate position between the bearing rings.

The steps named above are then repeated alternately up to the maximum possible filling of the radial anti-friction bearing with spherical rollers, so that then the shifting of the inner bearing ring known from the eccentric mounting method into a position concentric to the outer bearing ring can then take place. Then all of the inserted spherical rollers are distributed into their positions perpendicular to the raceways spaced at uniform distances to each other on the entire periphery of the raceways of the bearing rings or on their reference circle and are brought through rotation by 90° into their operating position arranged longitudinal to the raceways, so that then the insertion of the bearing cage through the space between the rims of the bearing rings can take place.

The spherical roller bearing formed according to the invention thus has the advantage relative to the spherical roller bearings known from the state of the art that it is now suitable, in addition to a high radial load capacity, also for variable axial loads under high operating pressure angles on both sides of the bearing longitudinal axis due to the configuration with very deep and very wide raceways for the spherical rollers in combination with the configuration of the spherical rollers with an optimum width of 70% of the diameter of its spherical base shape now.

BRIEF DESCRIPTION OF THE DRAWINGS

A preferred embodiment of the radial anti-friction bearing formed according to the invention will be explained in more detail below with reference to the accompanying drawings. Shown herein are.

DETAILED DESCRIPTION OF THE DRAWINGS

Figure 1:
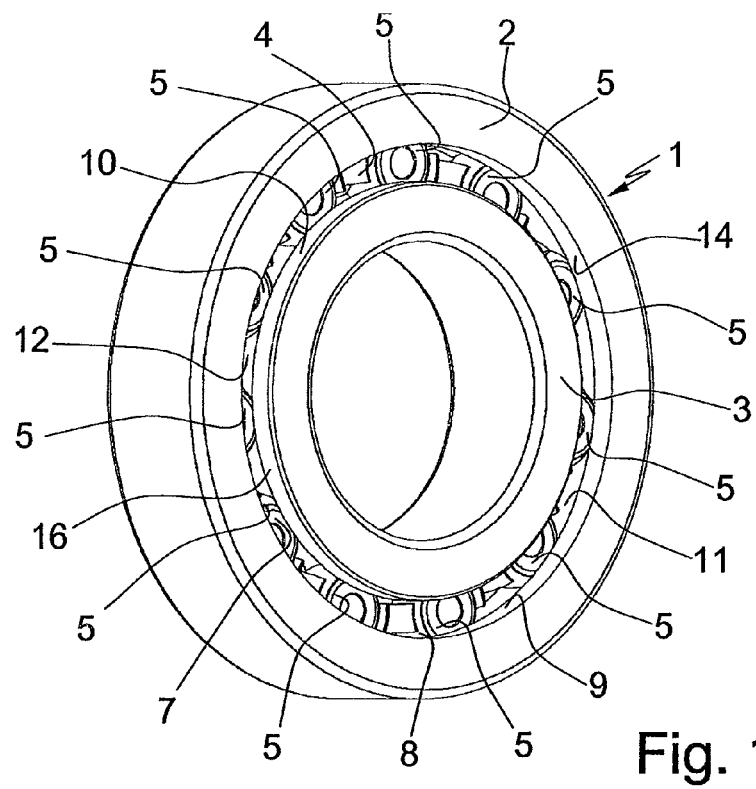
FIG. 1 is a three-dimensional overall view of a spherical roller bearing formed according to the invention.
Figure 2:
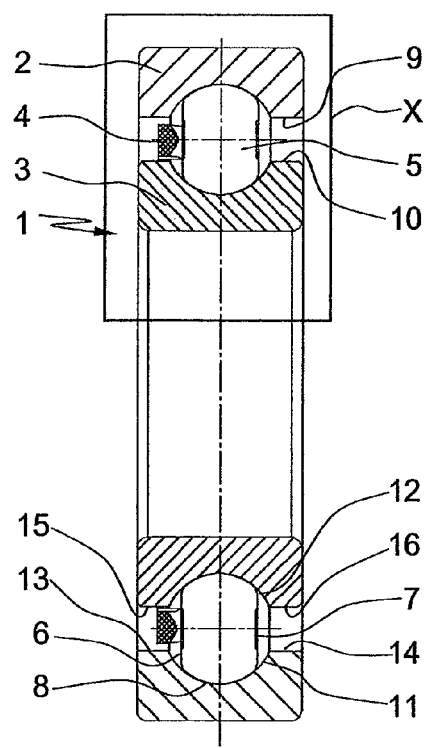
FIG. 2 is a cross sectional view through the spherical roller bearing formed according to the invention.

From FIGS. 1 and 2, a radial anti-friction bearing 1 formed as a single-row spherical roller bearing that essentially includes an outer bearing ring 2 and an inner bearing ring 3 and also a plurality of spherical rollers 5 that are arranged between these bearing rings 2, 3 and that each have two side surfaces 6, 7 that are arranged parallel to each other and that are flattened symmetrically from a spherical base shape. These spherical rollers 4 are held at uniform distances from each other in the peripheral direction clearly visible through a bearing cage 4 and roll with their running surfaces 8 in two groove-shaped raceways 11, 12 formed in the inside 9 of the outer bearing ring 2 and in the outside 10 of the inner bearing ring 3. These raceways are each defined by two axial rims 13, 14 and 15, 16. The spherical rollers 5 have a width $b_K$ of approximately 70% of the diameter $d_K$ of their spherical base shape between their side surfaces 6, 7, as emerges from FIG. 3, and are thus wider than the distance $a_B$ between the radially opposing, axial rims 13, 15 and 14, 16 of the raceways 11, 12 in the bearing rings 2, 3.

Figure 3:
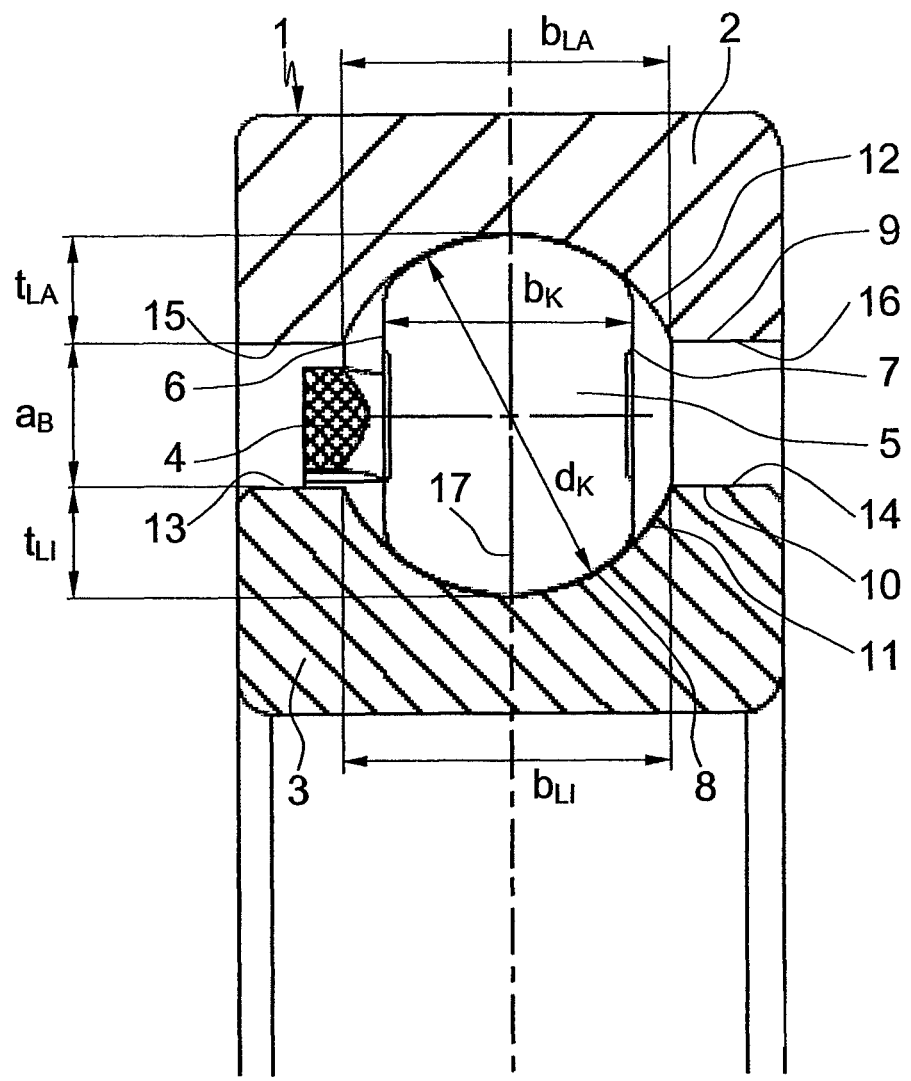
FIG. 3 is an enlarged view of one half of the cross section through the spherical roller bearing formed according to the invention according to detail X in FIG. 2.

In order to form a radial anti-friction bearing 1 constructed in this way with a very high axial load capacity, the raceways 11, 12 are formed in both bearing rings 2, 3, as can be taken from the FIGS. 2 and 3, according to the invention with such an extremely increased depth $t_{LA}$, $t_{LI}$ and width $b_{LA}$, $b_{LI}$ that the spherical rollers 5, with their running surfaces 8, are in complete linear contact with the raceways 11, 12 in the bearing rings 2, 3 even for variable axial loads under an operating pressure angle of up to 25° on both sides of the bearing longitudinal axis 17. Here, the distance $a_B$ shown in FIG. 3 between the radially opposing, axial rims 13, 15 and 14, 16 of the raceways 11, 12 in the bearing rings 2, 3 is kept so small that even for an eccentric arrangement of the bearing rings 2, 3 relative to each other as shown in FIG. 4, the distance $a_{Bex}$ is smaller than the diameter $d_K$ of the spherical base shape of the spherical rollers 5.

As an actual configuration, here through FIG. 3 it is clear that the depth $t_{LA}$, $t_{LI}$ of the raceways 11, 12 in the inside 9 of the outer bearing ring 2 and in the outside 10 of the inner bearing ring 3 equals approximately 30% of the diameter $d_K$ of the spherical base shape of the spherical rollers 5, while the width $b_{LA}$, $b_{LI}$ of the raceways 11, 12 equals approximately 90% of the diameter $d_K$ of the spherical base shape of the spherical rollers 5. From this drawing it also follows that, for the illustrated concentric arrangement of the bearing rings 2, 3 relative to each other, the distance $a_B$ between the radially opposing, axial rims 13, 15 and 14, 16 of the raceways 11, 12 equals only approximately 40% of the diameter $d_K$ of the spherical base shape of the spherical rollers 5, while in the eccentric arrangement of the bearing rings 2, 3 relative to each other shown in FIG. 4, the greatest distance $a_{Bex}$ between these axial rims equals approximately 80% of the diameter $d_K$ of the spherical base shape of the spherical rollers 5. Through the construction of the raceways 11, 12 with such dimensions, the spherical rollers 5 feature a one-hundred percent degree of osculation relative to their raceways 11, 12 even at operating pressure angles up to 25° and thus guarantee, for a full radial loading, an extremely high axial load capacity of the bearing, but simultaneously the spherical rollers 5 can no longer be mounted according to the conventional, known axial or eccentric mounting methods due to the distance $a_B$ or $a_{Bex}$ that is too small between the axial rims 13, 15 and 14, 16 of the raceways 11, 12.

Figure 4:
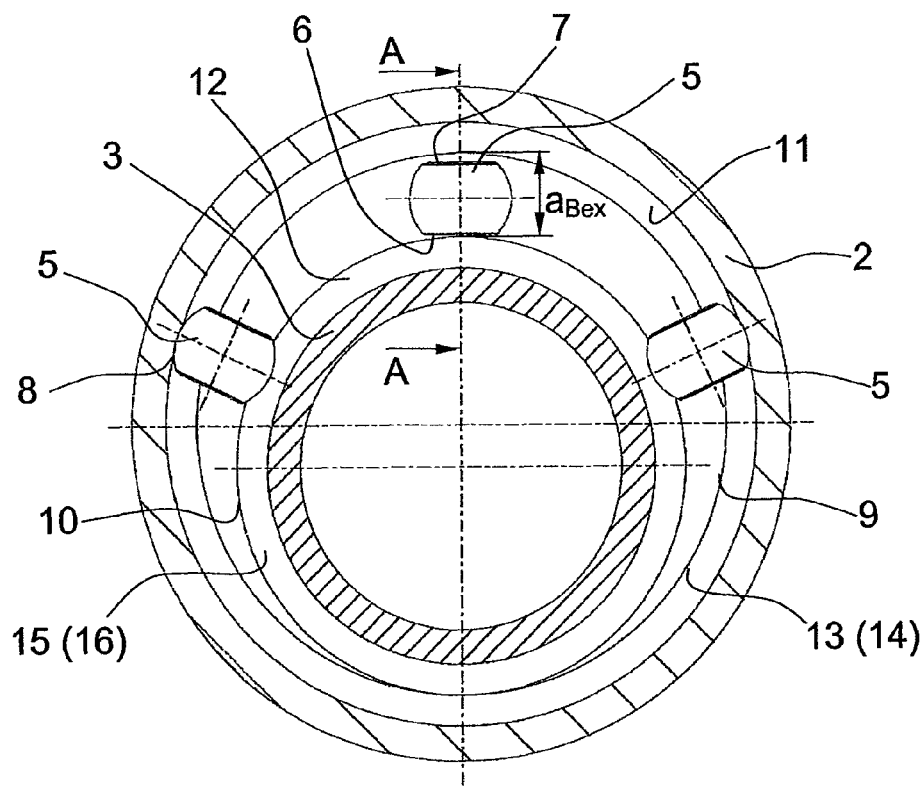
FIG. 4 is a side view of the spherical roller bearing formed according to the invention for mounting the spherical rollers.
Figure 5:
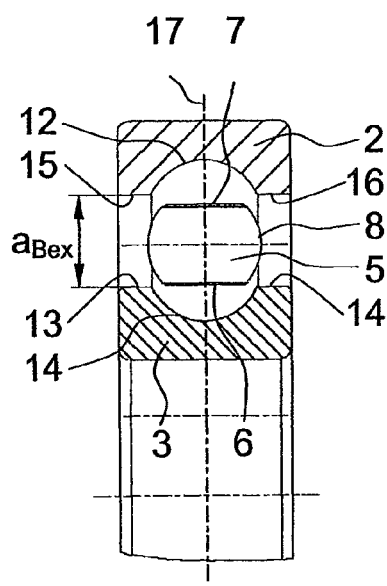
FIG. 5 is a cross sectional view of the spherical roller bearing formed according to the invention for mounting the spherical rollers.

The mounting of the spherical rollers 5 is therefore realized for a radial anti-friction bearing 1 constructed in this way according to the invention according to a modified eccentric mounting method in which initially the known placement, shown in FIG. 4, of the inner bearing ring 3 in the outer bearing ring 2 and the arrangement of the bearing rings 2, 3 in an eccentric position relative to each other on a common radial axis are performed. What is new, however, in this eccentric mounting method is that then the insertion of a first spherical roller 5 is performed in a tangential position shown in FIGS. 4 and 5 of the side surfaces 6, 7 relative to the bearing rings 2, 3 at the position of the greatest distance $a_{Bex}$ of the radially opposing rims 13, 15 and 14, 16 of the bearing rings 2, 3, in order to then tilt this first spherical roller 5 by 90° in the raceways 11, 12 of the bearing rings 2, 3 into a position perpendicular to these raceways and, in this position, to shift it into a first lateral intermediate position shown in FIG. 4 at the left of the vertical center axis between the bearing rings 2, 3. Then a second spherical roller 5 is shifted in a tangential position of the side surfaces 6, 7 relative to the bearing rings 2, 3 at the position of the greatest distance $a_{Bex}$ of the rims 13, 15 and 14, 16 between the bearing rings 2, 3, in order to be tilted also by 90° in the raceways 11, 12 of the bearing rings 2, 3 into a position perpendicular to these raceways and to be shifted in this position into a second lateral intermediate position shown in FIG. 4 at the right of the vertical center axis between the bearing rings 2, 3.

Then an alternating repetition of the previously mentioned steps is performed up to the maximum possible filling of the radial anti-friction bearing 1 with spherical rollers 5, so that then the known shifting of the inner bearing ring 3 can then be performed into a position concentric to the outer bearing ring 2. Then all of the inserted spherical rollers 5 are distributed in uniform distances in their positions perpendicular to the raceways 11, 12 on a reference circle and are brought by rotation by 90° into their operating positions shown in FIG. 1 and arranged longitudinal to the raceways 11, 12, so that then the insertion of the bearing cage 4 into the space indicated by the dimension $a_B$ between the rims 13, 15 and 14, 16 of the bearing rings 2, 3 can be performed.

LIST OF REFERENCE SYMBOLS

1 Radial anti-friction bearing
2 Outer bearing ring
3 Inner bearing ring
4 Bearing cage
5 Spherical rollers
6 Side surface of 5
7 Side surface of 5
8 Running surface of 5
9 Inside of 2
10 Outside of 3
11 Raceway in 9
12 Raceway in 10
13 Rim of 11
14 Rim of 11
15 Rim of 12
16 Rim of 12
17 Bearing longitudinal axis $b_K$ Width of 5
$d_K$ Diameter of spherical base shape of 5
$t_{LA}$ Depth of 11
$t_{LI}$ Depth of 12
$b_{LA}$ Width of 11
$b_{LI}$ Width of 12
$a_B$ Distance between 13 and 15 or 14 and 16
$a_{Bex}$ Distance between 13 and 15 or 14 and 16 for eccentric arrangement of 2 and 3

The invention claimed is:

1. Radial anti-friction bearing, comprising a single-row spherical roller bearing that includes an outer bearing ring and an inner bearing ring and also a plurality of spherical rollers that are arranged between the bearing rings and that are held at uniform distances from each other in a peripheral direction by a bearing cage and each of the spherical rollers have two side surfaces flattened symmetrically from a spherical base shape and arranged parallel to each other and roll with running surfaces thereof in two groove-shaped raceways formed in an inside of the outer bearing ring and in an outside of the inner bearing ring, the raceways are each defined by two axial rims, respectively, and a width of the spherical rollers between the side surfaces equals at least 70% of a diameter of the spherical base shape and is greater than a distance between the radially opposing, axial rims of the raceways in the bearing rings, the raceways are formed in both of the bearing rings with a depth and width so that the running surfaces of the spherical rollers are in complete linear contact with the raceways in the bearing rings even for variable axial loads under an operating pressure angle of up to 25° on both sides of a bearing longitudinal axis and the distance between the radially opposing, axial rims of the raceways in the bearing rings is less than the diameter of the spherical base shape of the spherical rollers even for the bearing rings arranged in a position eccentric relative to each other.

2. Radial anti-friction bearing according to claim 1, wherein for the raceways in the inside of the outer bearing ring and in the outside of the inner bearing ring, the depth is greater than 25% of the diameter of the spherical base shape of the spherical rollers.

3. Radial anti-friction bearing according to claim 2, wherein for the raceways in the inside of the outer bearing ring and in the outside of the inner bearing ring, the width is greater than 85% of the diameter of the spherical base shape of the spherical rollers.

4. Radial anti-friction bearing according to claim 3, wherein for a concentric arrangement of the bearing rings relative to each other, the distance between the radially opposing, axial rims of the raceways equals only approximately 40% to 50% of the diameter of the spherical base shape of the spherical rollers.

5. Radial anti-friction bearing according to claim 4, wherein for an eccentric arrangement of the bearing rings relative to each other, a greatest distance between the radially opposing, axial rims of the raceways equals between 75% to 90% of the diameter of the spherical base shape of the spherical rollers.

* * * * *